US006564120B1

(12) United States Patent
Richard et al.

(10) Patent No.: US 6,564,120 B1
(45) Date of Patent: May 13, 2003

(54) STORAGE SYSTEM, PARTICULARLY WITH AUTOMATIC INSERTION AND RETRIEVAL

(75) Inventors: Daniel D. Richard, Sedona, AZ (US); Robert Vago, Palm Harbor, FL (US)

(73) Assignee: Cryo-Cell International, Inc., Clearwater, FL (US)

( * ) Notice: Subject to any disclaimer, the term of this patent is extended or adjusted under 35 U.S.C. 154(b) by 0 days.

(21) Appl. No.: 09/569,914

(22) Filed: May 11, 2000

(51) Int. Cl.[7] .............................. G06F 7/00; B65B 1/00; B65B 65/00
(52) U.S. Cl. .................... 700/214; 901/47; 414/277; 414/279
(58) Field of Search ................................. 700/213, 214; 414/273, 269, 271, 277, 279; 901/46, 47

(56) References Cited

U.S. PATENT DOCUMENTS

| | | | | |
|---|---|---|---|---|
| 4,219,296 A | * | 8/1980 | Fujii et al. ............... | 414/273 |
| 4,804,307 A | * | 2/1989 | Motoda ................... | 414/273 |
| 4,812,629 A | | 3/1989 | O'Neil et al. | |
| 4,824,311 A | * | 4/1989 | Mims ..................... | 414/273 X |
| 5,174,454 A | * | 12/1992 | Parkander ............... | 700/213 X |
| 5,379,229 A | * | 1/1995 | Parsons et al. ......... | 700/213 X |
| 5,450,385 A | * | 9/1995 | Ellis et al. .............. | 369/34 X |
| 5,985,214 A | | 11/1999 | Stylli et al. | |
| 6,005,734 A | * | 12/1999 | Shimada et al. ......... | 360/69 |
| 6,031,798 A | | 2/2000 | James et al. | |
| 6,038,490 A | | 3/2000 | Dimitri et al. | |

* cited by examiner

Primary Examiner—Christopher P. Ellis
Assistant Examiner—Gene O. Crawford
(74) Attorney, Agent, or Firm—R. Neil Sudol; Henry Coleman; William Sapone

(57) ABSTRACT

A storage system particularly for storing biological materials such as blood, stem cells, and DNA includes a storage unit having at least three vertical sides, at least two of the three vertical sides each being provided with a plurality of individually accessible storage receptacles. A plurality of boxes or cassettes are removably disposed in respective ones of the storage receptacles. At least one robot mechanism is movable along a track section or path extending to the two vertical sides of the unit, the robot mechanism having a robotic arm for accessing the storage receptacles. A computer is operatively connected to the robot mechanism for controlling movement and access operations thereof and for registering the contents of the storage receptacles. Where the storage unit is disposed in a room, additional storage receptacles may be disposed in a rectangular array inside a wall of the room. The boxes or cassettes contain a multiplicity of vials at least some of which may be segmented, with a plurality of separable compartments.

31 Claims, 6 Drawing Sheets

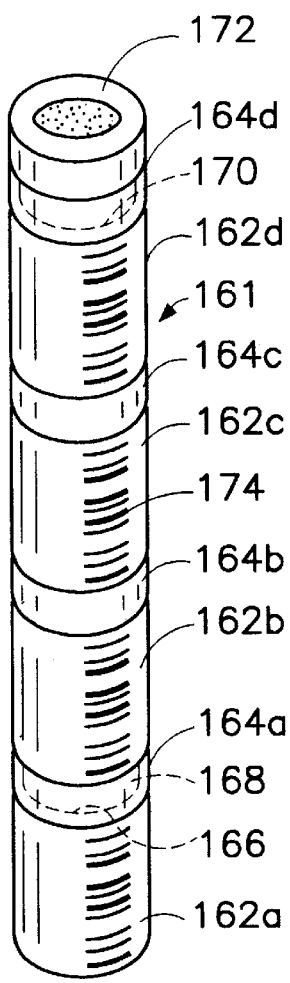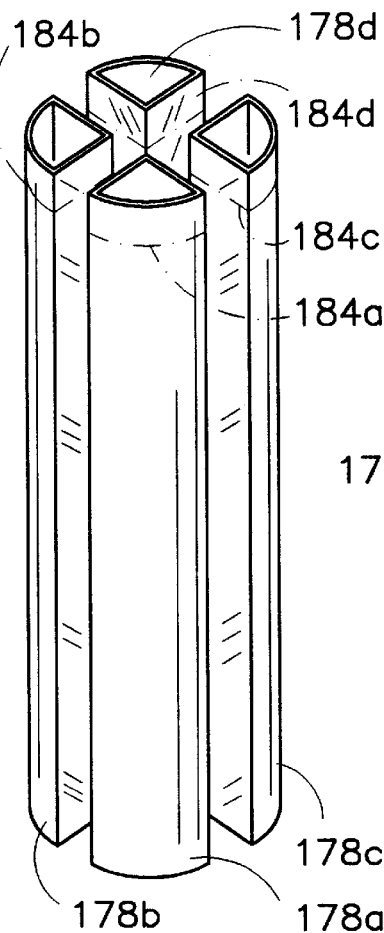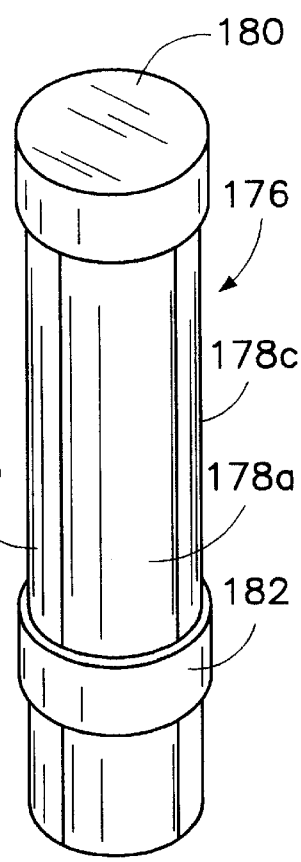
FIG.12  FIG.14  FIG.13
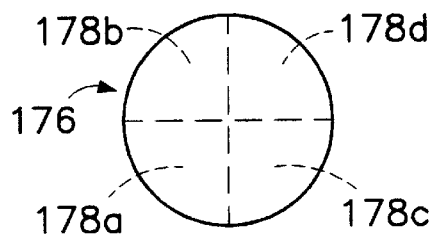
FIG.15
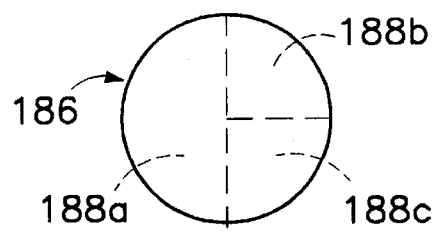
FIG.16

STORAGE SYSTEM, PARTICULARLY WITH AUTOMATIC INSERTION AND RETRIEVAL

BACKGROUND OF THE INVENTION

This invention relates to a computer-controlled robotically operated storage system. More particularly, this invention relates to a storage system with automatic insertion and retrieval of samples from a storage container or unit. The invention is especially useful in the preservation of biological specimens at various temperatures, including room temperature and the temperature of liquid nitrogen. This invention also relates to an associated method for inventory control and storing samples or specimens such as DNA, blood, stem cells, as well as pharmaceutical compounds.

When properly treated, biological specimens can be stored almost indefinitely at temperatures approaching that of liquid nitrogen so long as that temperature is maintained. However, once the temperature of a specimen is raised, especially to a level where thawing occurs, the integrity of the specimen might suffer if the specimen is then refrozen.

Many conventional cryogenic storage units are simple containers with removable racks having multiple shelves. Specimens are inserted and removed from the storage units manually through a door in the top of the unit.

A considerable advance in the mass cryogenic storage of biological specimens was made with U.S. Pat. No. 4,969,336. That patent disclosed the automated moving of specimens along a predetermined path inside a storage tank, with automated insertion and retrieval operations under computerized tracking control.

A further significant improvement in the cryogenic storage arts was introduced with U.S. Pat. No. 5,233,844. That patent discloses a cryogenic storage unit comprising a plurality of independently rotatable storage shelves located one above the other in an insulated chamber. Each shelf supports several pie-slice-shaped trays each carrying a multiplicity of specimens in vials. The shelves each have a pie-slice-shaped opening, with these openings being disposed one above the other to define a vertical access path. To retrieve a particular vial or specimen from the storage unit, the shelf containing the desired specimen is rotated so that the tray containing the specimen is located in the access path. A lift mechanism raises the tray to the top of the unit where a robotic arm retrieves the desired specimen.

U.S. Pat. No. 5,921,102 discloses a cryogenic storage unit which has a reduced number of moving parts. A multitude of vials are stored in radial orientations in the cylindrical wall of a carrier rotatably disposed inside a cryogenic storage container. A cylindrical wall of the container is provided with a vertical access slot which is closed by a plug disposed in the slot. The plug is pushed into the container and held in a temporary seat on the vial carrier during an access operation in which a robotic arm inserts a suction-type grasping member through the slot and into the storage container. In some applications, it is desirable to store vials in trays.

Any of the above described storage units may be ganged to increase storage capacity at a storage facility.

OBJECTS OF THE INVENTION

An object of the present invention is to provide an improved storage system with automatic insertion and retrieval.

A further object of the present invention is to provide a storage system with increased storage capacity.

Yet another object of the present invention is to provide a storage system wherein specimens can be stored at room temperature or a temperature lower than room temperature.

Yet another object of the present invention is to provide an automatic storage system which has a container utilizable for storing individual vials and/or trays.

Related objects of the invention pertain to a storage method.

These and other objects of the present invention will be apparent from the drawings and descriptions herein.

SUMMARY OF THE INVENTION

A storage system particularly for storing biological materials such as blood, stem cells, and DNA comprises, in accordance with a first embodiment of the present invention, a storage unit having at least three vertical sides, at least two of the three vertical sides each being provided with a plurality of individually accessible storage receptacles. A plurality of boxes or containers are removably disposed in respective ones of the storage receptacles. At least one robot mechanism is movable along a track section or path extending to the storage receptacles in the two vertical sides of the unit, the robot mechanism having a robotic arm for accessing the storage receptacles. A computer is operatively connected to the robot mechanism for controlling movement and access operations thereof and for registering the contents of the storage receptacles.

The storage unit may have any columnar configuration, i.e., a configuration in which receptacles may be stacked. However, prismatic configurations with polygonal cross-sections, particularly rectangular or square cross-sections, are preferred. The storage unit may be disposed on a floor surface within a room. It is possible, however, for this storage unit to be suspended from an overhead superstructure.

The individually accessible storage receptacles in two or more sides of the storage unit are preferably arranged in rectangular arrays. It is not necessary however, that all of the storage receptacles have the same size. The receptacles generally have their own access openings through which the storage boxes or containers are moved during robot-mediated insertion and removal operations.

The storage unit may be combined in a storage facility with other storage units arranged, for instance, along or within the walls of an enclosure. In that case, a track section or path extends to the wall-based storage unit for enabling robotic access to the receptacles therein.

Preferably, the storage boxes or contains each hold a plurality of specimen-containing vials, at least some of which are compartmentalized or segmented to provide multiple storage compartments for storing respective biologically related specimens. For instance, different compartments of the same segmented vial might store DNA, a blood sample, stem cells, and one or more tissue samples all from the same individual. Alternatively, the compartments of a single vial might store stem cells suitable for generating cells of different types, such as skin, bone, muscle, liver, pancreas, and nerve cells.

Preferably, the different segments or compartments of a segmented vial are removably connected to one another, whereby any one of the segments may be separated from another segment while maintaining complete integrity of contents of the separated segments.

A storage system comprises, in accordance with another embodiment of the present invention, an enclosure having a plurality of vertical walls connected to one another via a floor surface, a rectangular grid array of first storage receptacles disposed along at least one of the walls, second storage receptacles disposed inside the enclosure and spaced from the walls, at least one track section extending along the one of the walls, parallel thereto, an additional track section extending to the second storage receptacles, a robot mechanism movably mounted to the first track section, the robot mechanism having a robotic arm for accessing the first storage receptacles, and a computer operatively connected to the robot mechanism for controlling movement and access operations thereof and for registering the contents of the storage receptacles.

Further track sections or robot rails can be provided to serve the needs of the system. For example, where the second storage receptacles are disposed in a columnar arrangement inside the enclosure, the additional track section may be one of several track sections collectively surrounding the column of the second storage receptacles. One or more additional robot mechanisms may be provided, for example, on the several track sections around the free-standing column for accessing the second storage receptacles. The second storage receptacles may be located in a plurality of columnar units which may be ganged together or free standing.

Preferably, the first receptacles are located within the one wall of the enclosure. The first receptacles are analogous to safe deposit boxes in this regard. The wall includes an outer panel and an inner panel perforated to provide access to the first receptacles.

In a preferred embodiment of the invention, the enclosure has four walls and at least three of those walls are provided with respective arrays of first storage receptacles. These walls are further provided with respective track sections extending along the walls for enabling access to the first storage receptacles by one or more robot mechanisms.

Temperature control elements may be operatively connected to each the three walls for maintaining the storage receptacles of each wall or portions thereof at a respective pre-selected temperature. It is contemplated that the second storage receptacles are generally maintained at or about room temperature. However, the second storage receptacles may be maintained at a temperature different from room temperature. In that case, a temperature control element such as a heat exchanger is operatively coupled to the second storage receptacles for maintaining contents thereof in a preselected temperature range.

Pursuant to a further feature of the present invention, the storage system additionally comprises a multiplicity of cassettes each disposed in a respective one of the first storage receptacles and the second storage receptacles. The cassettes each include a pair of storage chambers or compartments accessed via respective covers or doors disposed on opposite sides of the respective cassette.

A related storage method comprises, in accordance with the present invention, providing an enclosure having an array of storage receptacles disposed in the enclosure, providing multiple specimen-containing vials in cassette-type containers, operating a robot mechanism to insert the cassette-type containers in respective ones of the storage receptacles, and further operating the robot mechanism to selectively remove the cassette-type containers from the respective storage receptacles.

The robot mechanism may be further operated to extract one of the specimen-containing vials from a respective one of the removed cassette-type containers. Where the cassette-type containers each include a pair of storage chambers or compartments separated by a partition, the operating of the robot mechanism to extract the one of the specimen-containing vials includes accessing one of the storage chambers or compartments via a respective cover or door disposed on one of two opposite sides of the respective cassette-type container. These covers or doors are alternatively slid or pivoted open. It is contemplated that the operating of the robot mechanism to extract the one specimen-containing vial further includes operating the robot mechanism to rotate the one cassette-type container prior to the accessing of the relevant storage chamber or compartment.

Where rectangular grid array of the storage receptacles is a free-standing column, the method further comprises operating one or more robot mechanisms to access the storage receptacles from different sides of the column.

A storage system in accordance with the present invention permits temporary or permanent storage of vast numbers of specimens. The storage capability of the system is enhanced, individually and collectively, by the rectangular storage grid, multiple robot access mechanisms, computer control, and the dual compartment storage cassettes.

BRIEF DESCRIPTION OF THE DRAWINGS

FIG. 12 is a schematic side and top perspective view of a multiple-compartment vial utilizable in the storage cassette of FIGS. 5 and 6.

FIG. 13 is a schematic side and top perspective view of another multiple-compartment vial utilizable in the storage cassette of FIGS. 5 and 6.

FIG. 14 is an exploded schematic side and top perspective view of parts of the vial of FIG. 13.

FIG. 15 is a top plan view of the vial of FIG. 13.

FIG. 16 is a top plan view similar to FIG. 15, showing a modification of the vial of FIGS. 13–15.

DESCRIPTION OF THE PREFERRED EMBODIMENTS

Figure 1:
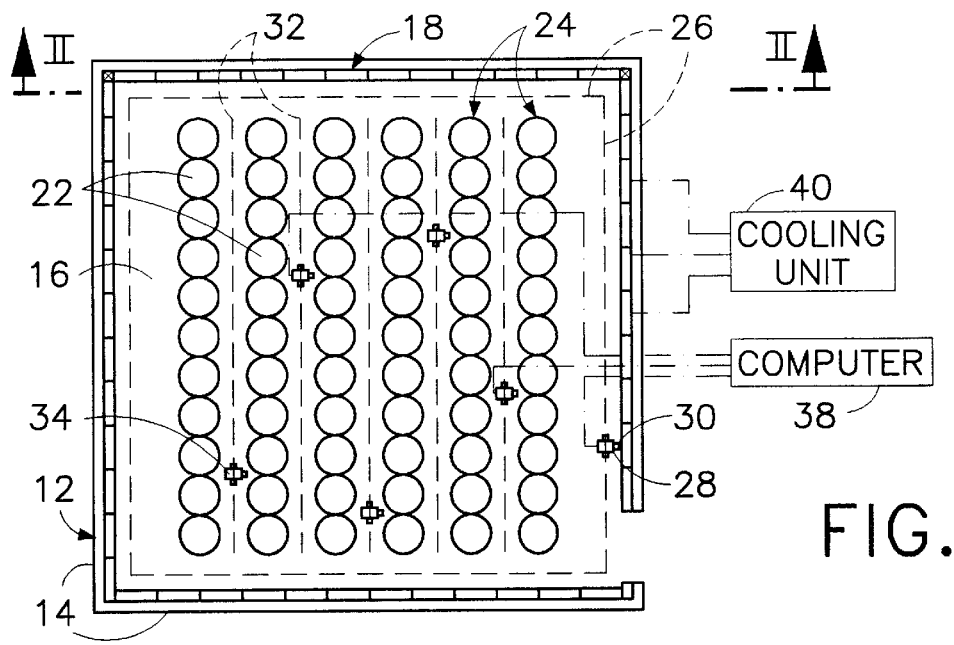
FIG. 1 is a schematic plan view of a storage system in accordance with the present invention.
Figure 2:
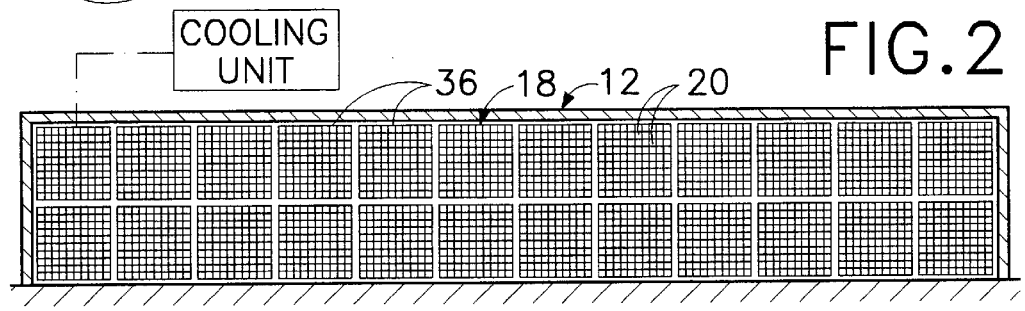
FIG. 2 is a cross-sectional view taken along line II—II in FIG. 1.
Figure 3:
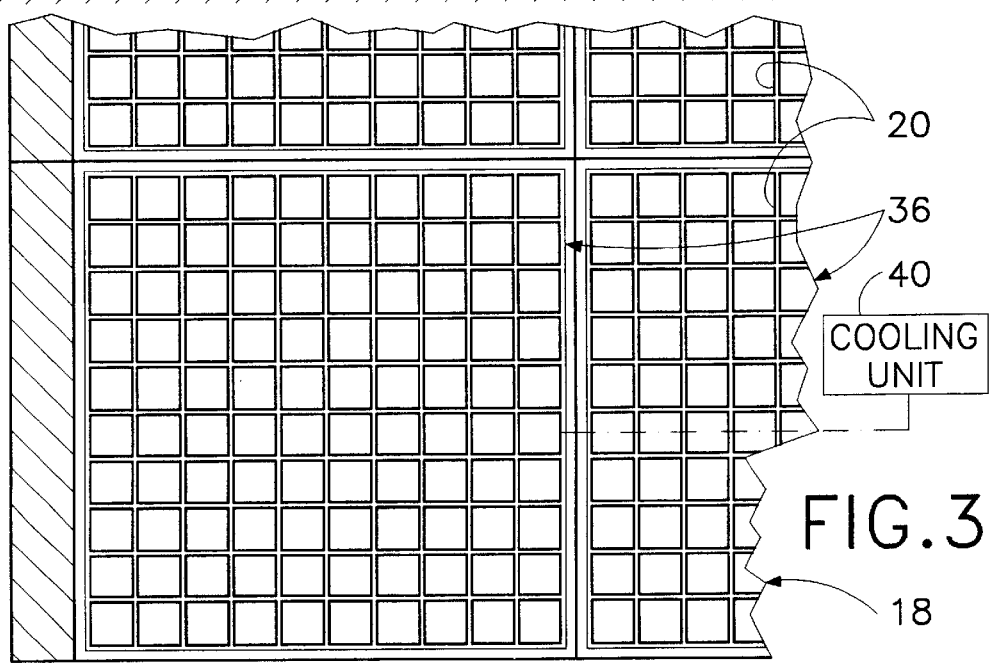
FIG. 3 is a partial cross-sectional view on an enlarged scale, also taken along line II—II in FIG. 1.

FIGS. 1–3 schematically depict a storage system comprising an enclosure 12 having a plurality of vertical walls 14 connected to one another via a floor surface 16. A rectangular grid array 18 of first storage receptacles 20 (FIGS. 2 and 3) is disposed along one or more walls 14 of enclosure or room 12. Cylindrical storage containers or tanks 22 are disposed in a plurality of linear arrays 24 inside enclosure 12. Storage containers 22 are spaced from walls 14 and grid arrays 18 and may take any form known in the art such as that described and depicted in U.S. Pat. Nos. 4,969,336, 5,233,844, or 5,921,102.

Track sections or rails 26 extend along respective walls 14, parallel thereto, for guiding and supporting a movable robot mechanism 28 which has a robotic arm 30 for accessing storage receptacles 20 of grid arrays 18. A single robot mechanism 28 may be used to access all storage receptacles 20 along walls 14. Alternatively, to expedite accessing operations, a plurality of robot mechanisms (not shown) may be provided, for example, one, two or more for each track section 26.

Further track sections or rails 32 extend to storage containers 22, along container arrays 24, for enabling access to the storage receptacles in the storage containers 22. At least one robot mechanism 34 is movably mounted to each track section 32 for accessing the receptacles in storage containers 22 disposed along that track section. The various robot mechanisms move between the respective storage modules or containers, on the one hand, and a serving hatch (not shown) provided in a wall 14 of enclosure 12.

As shown in FIGS. 2 and 3, each grid array 18 comprises a plurality of rectangular grid modules 36 each having a multitude of receptacles 20. Modules 36 are preferably stacked in at least two tiers or horizontal rows. A heat exchanger 40, particularly, a cooling unit located on a roof or outside the respective building, is operatively coupled to one or more modules 36 for maintaining the storage receptacles 20 of those modules and the contents of the respective storage receptacles at preselected temperatures, for instance, at room temperature or lower. Commonly used low (non-cryogenic) temperatures are minus 20° C. and minus 80° C. Thus, different modules 36 may be maintained at different temperatures ranging from room temperature down to cryogenic temperatures (minus 196° C.).

A computer 38 is operatively connected to robot mechanisms 28 and 34 for controlling movement and access operations thereof and for registering the contents of storage receptacles 20 and the storage receptacles of containers 22. Robot mechanisms 28 and 34 are provided with bar code readers (not shown) for identifying specimens stored in the receptacles of grid arrays 18 and storage containers 22. The bar code readers are tied to computer 38 for enabling continued automated supervision and control. Of course, temperature sensors and feedback loops (not illustrated) are in operative contact with modules 36 and cooling unit(s) 40 for monitoring and controlling the temperatures of modules 36 and storage containers 22.

Figure 4:
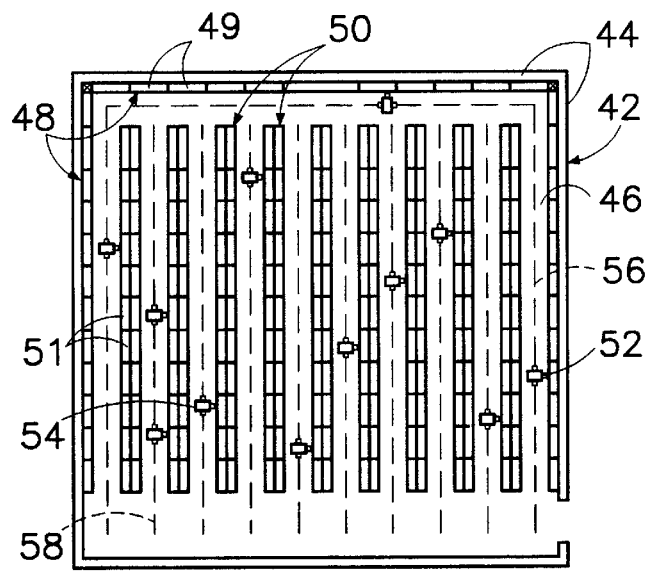
FIG. 4 is a schematic plan view of another storage system in accordance with the present invention.

FIG. 4 depicts an alternative storage system comprising an enclosure 42 having a plurality of vertical walls 44 connected to one another via a floor surface 46. Rectangular grid arrays 48 of storage receptacles are disposed along walls 44. As discussed above with reference to FIGS. 2 and 3, grid arrays 48 comprise modules 49 of multiple storage receptacles stacked in two horizontal rows or tiers. Inside enclosure 42, spaced from walls 44 and grid arrays 48, are a plurality of additional rectangular grid arrays 50 which may be single or multiple tiers of storage modules 51. Grid arrays 48 and 50 are serviced by multiple robot mechanisms 52 and 54 movably mounted to respective tracks or rails 56 and 58 which extend along grid arrays 48 and 50.

Figure 5:
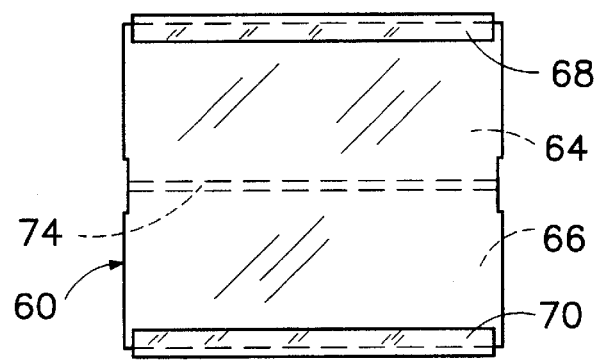
FIG. 5 is a side elevational view of a vial-containing cassette.
Figure 7:
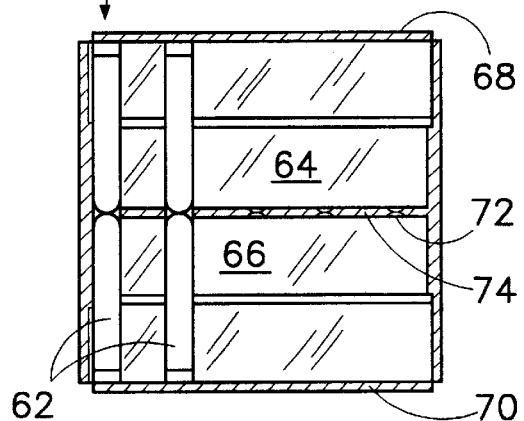
FIG. 7 is a transverse cross-sectional view of the cassette of FIGS. 5 and 6, taken along line VII—VII in FIG. 6. Fewer vials are shown in FIG. 7 for purposes of simplicity.
Figure 6:
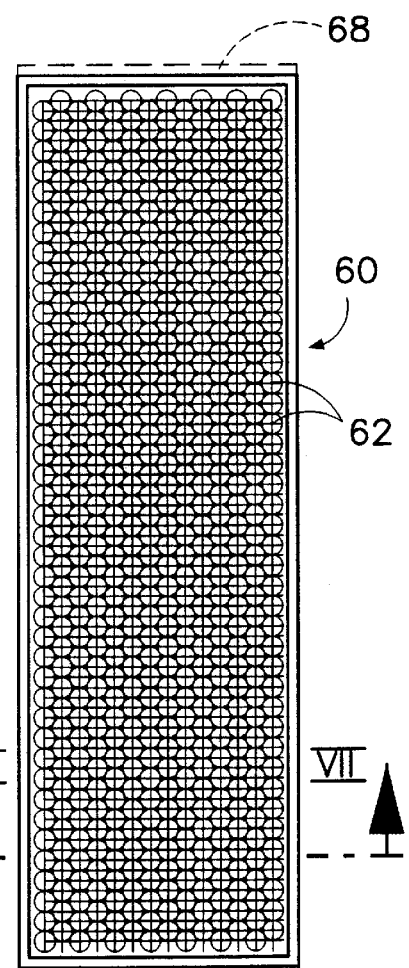
FIG. 6 is a to plan view of the cassette of FIG. 5, with a cover removed to show vials.

FIGS. 5, 6 and 7 depict a vial cassette or box 60 for containing a multitude of vials 62. Cassette 60 has two oppositely facing compartments 64 and 66 each closed by respective friction-lock, slide-lock or snap-lock covers 68 and 70. Vials 62 in compartments 64 and 70 face in opposite directions, as indicated in FIG. 7. The vials 62 are seated in recesses or holes 72 in a plate 74 which divides cassette 60 into compartments 64 and 66. Of course, cassette 60 may contain vials of different diameters.

The cassettes are inserted by robot mechanism 28, 52, or 54 into receptacles 20 in modules 36, 49, or 5 1. When it is necessary to access a particular vial 62, robot mechanism 28, 52, or 54 moves under the control of computer 38 to a location along the module 36, 49, or 51 where the vial is stored in a respective cassette 60. Robot mechanism 28, 52, or 54 grasps a hook or other coupling element (not illustrated) on the cassette 60 and pulls on the coupling element to extract the cassette from its storage receptacle 20. If the target vial 62 is stored in the lower compartment 66 of the cassette 60, robot mechanism 28, 52, or 54 manipulates the cassette at least in part via the coupling element to rotate the cassette about a longitudinal axis so that compartment 66 is now on the upper side of the cassette. Robot mechanism 28, 52, or 54 then opens the appropriate cover 68 or 70 and removes the target vial 62. The access steps are executed by robot mechanism 28, 52, or 54 in reverse to place the cassette 60 back in the proper orientation in its storage receptacle. Alternatively, the cassette 60 may be replaced in its storage receptacle 20 in an upside-down orientation which is communicated to computer 38 and thus stored therein as the current orientation of the cassette. In any case, computer 38 is operatively connected to robot mechanisms 28, 52, and 54 for controlling and monitoring the operation thereof and for tracking the locations of all cassettes 60 and vials 62.

Robot mechanisms 28, 52, and 54 may take a form essentially described in U.S. Pat. No. 5,921,102, except that the robot mechanism is provided with a propulsion capability for moving along tracks or rails 26, 32, 56 and 58, respectively. The propulsion equipment can take any of the well known forms and include, for instance, an electrical motor, a hydraulic or pneumatic mechanism, or a magnetic field generator. The propulsion equipment may include a power transmission including, for example, chains and sprockets, rack and pinions, cables and pulleys, gears, solenoids, etc. Tracks or rails 26, 32, 56 and 58 may be elongate physical elements such as metal beams disposed on floor surface 16, 46 or suspended above floor surface 16, 46. Alternatively, tracks or rails 26, 32, 56 and 58 may be simply travel paths of robot mechanisms 28, 52, and 54. In any case, the linear positions of robot mechanisms 28, 52, and 54 along tracks, rails or paths 26, 32, 56, and 58 may be measured by any technology currently known or developed in the future including encoders, optical, electrical, or magnetic sensors, path markings, pattern recognition, radar and ultrasound. The sensors may be disposed on the robot mechanisms 28, 52, and 54 or on stationary fixtures. Accordingly, it is to be understood that the terms "track, ""track section,""rail," or "rail section" are used herein to designate any predetermined fixed path of motion of a robot assembly, wherein the position of the robot assembly along the path is controlled and ascertainable with effective precision at all times.

The end walls of each cassette 60 may be provided with a bar code (not illustrated) for identifying the contents of the cassette. These bar codes identify the highest numbered and lowest numbers vials stored in the respective cassette. Likewise, each vial 62 may be provided with a respective bar code.

It is to be noted that cassettes 60 are removable from their respective storage receptacles 20 and may be conveyed by the robot mechanisms 28, 52, and 54 to a door or window for transport to another location.

Figure 8:
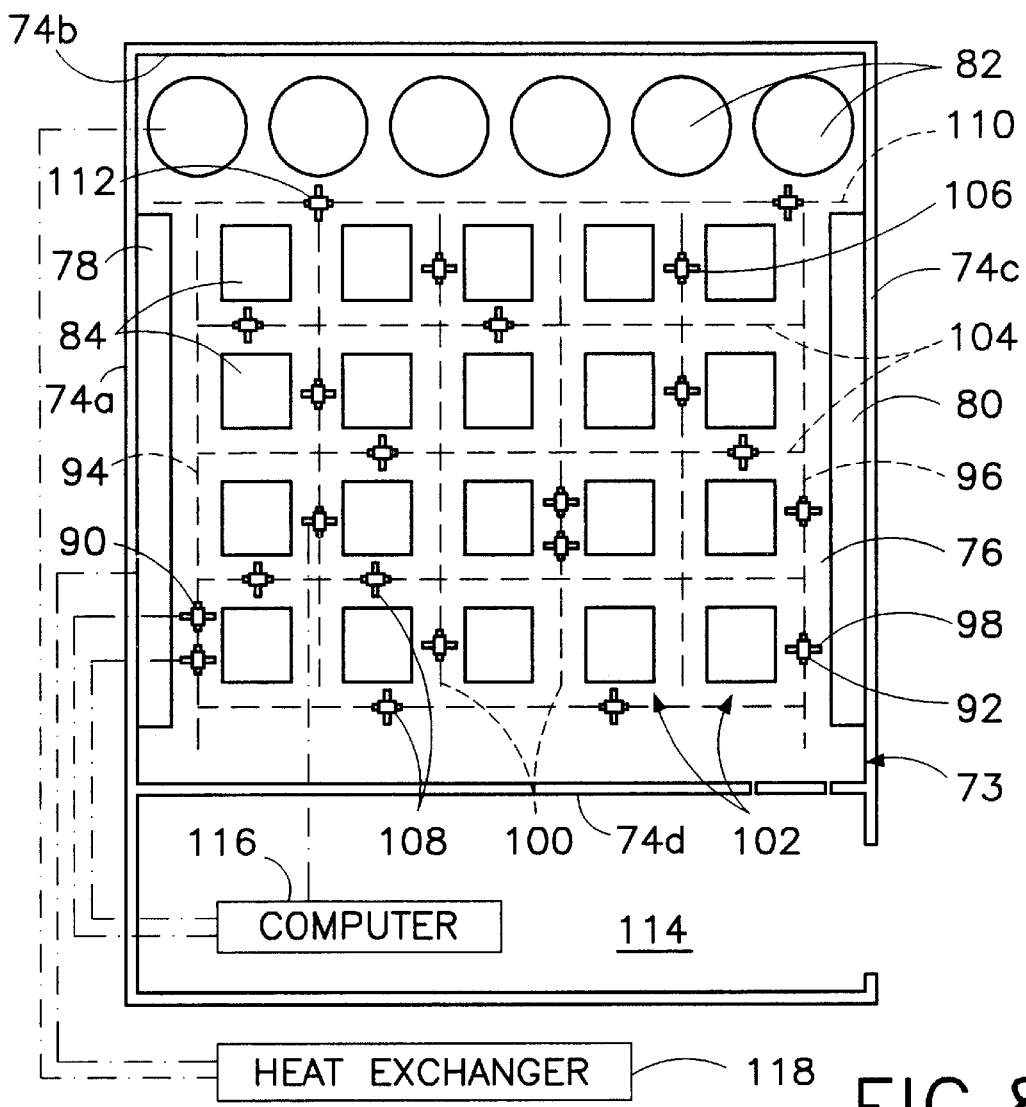
FIG. 8 is a schematic plan view of another storage system in accordance with the present invention.

As depicted in FIG. 8, another alternative storage system comprises an enclosure 73 having a plurality of vertical walls 74a, 74b, 74c, 74d connected to one another via a floor surface 76. A rectangular grid array 78 of storage receptacles similar to receptacles 20 (FIGS. 2 and 3) is disposed along one wall 74a of enclosure or room 73. Another rectangular grid array 80 of similar storage receptacles is disposed along wall 74c. Cylindrical storage containers or tanks 82 are disposed rear wall 74b. Storage containers 82 may take any form known in the art such as that described and depicted in U.S. Pat. Nos. 4,969,336, 5,233,844, or 5,921,102.

Figure 9:
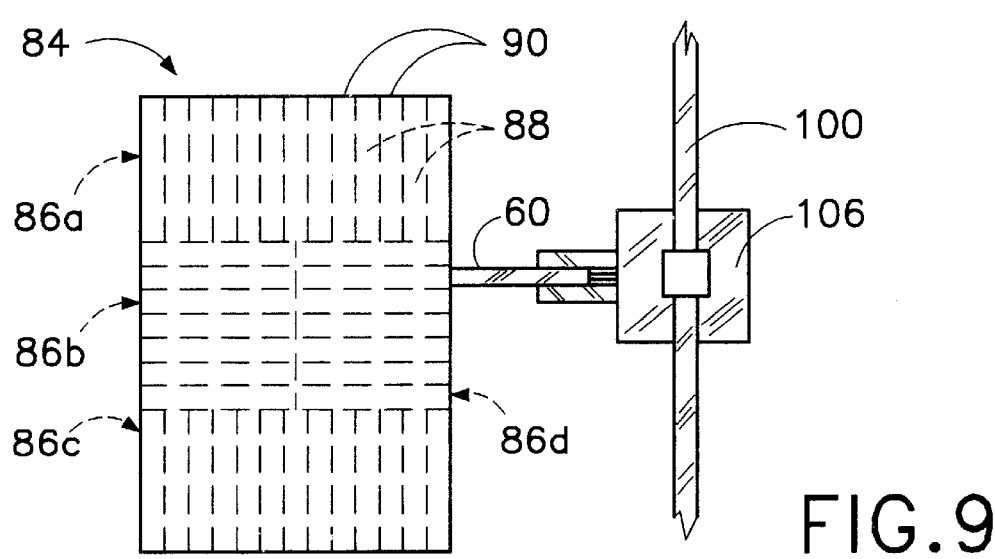
FIG. 9 is a schematic top plan view of a prismatic storage unit included in the storage system of FIG. 8.
Figure 10:
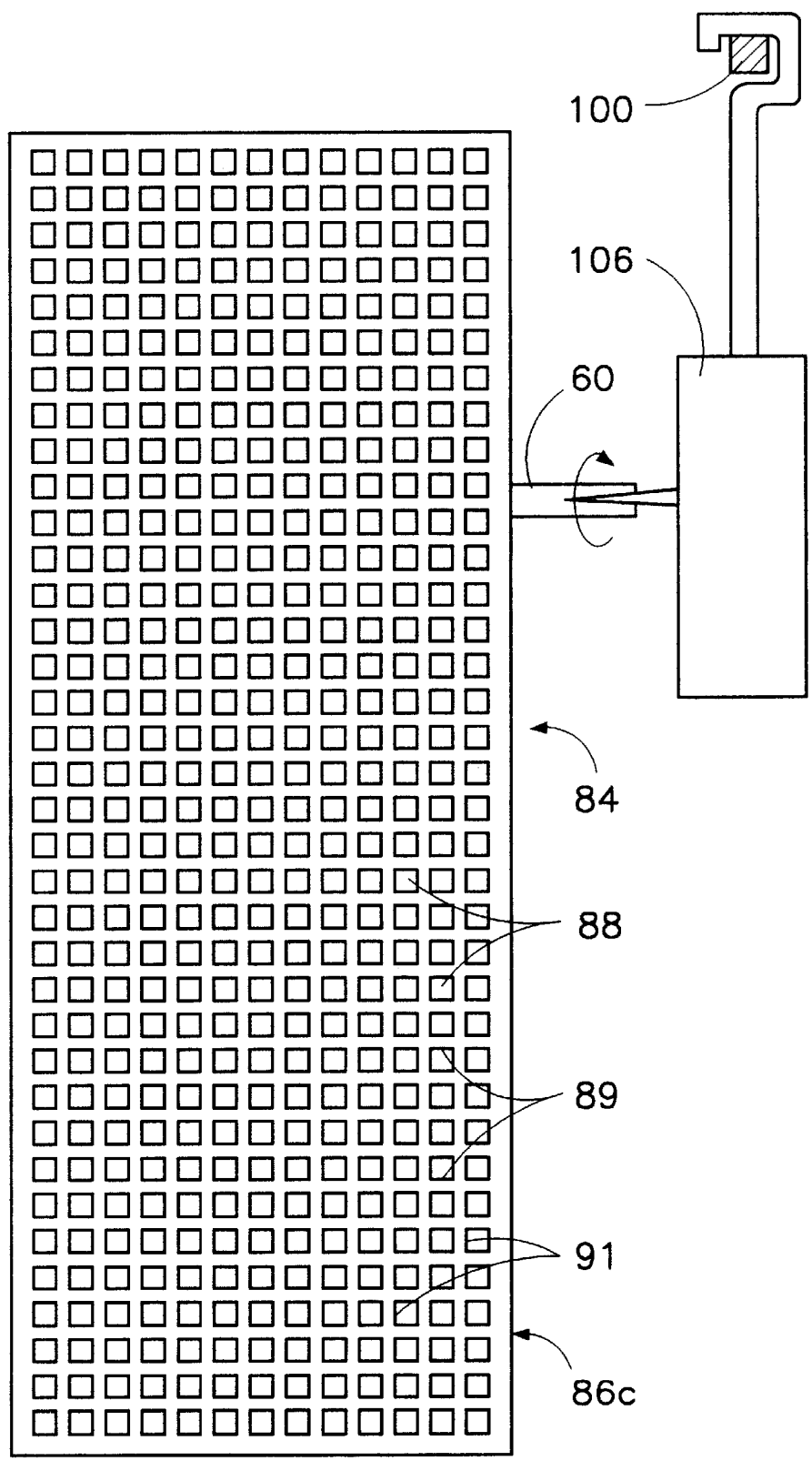
FIG. 10 is a schematic front elevational view of the storage unit of FIG. 9, taken from the bottom in that drawing figure.

As discussed above with reference to FIGS. 2 and 3, grid arrays 78 and 80 comprise modules of multiple storage receptacles stacked in a plurality of horizontal rows or tiers. Inside enclosure 73, spaced from walls 74a–74d, grid arrays 78 and 80, and storage containers 82, are a plurality of additional rectangular or prismatic storage units 84. As illustrated in FIGS. 9 and 10, storage units 84 each comprise several rectangular arrays or columns 86a, 86b, 86c, 86d of stacked storage receptacles 88. Storage receptacles 88 are elongate prismatic cells each receiving a respective dual-chambered vial cassette 60 (FIGS. 5–7). Storage receptacles 88 are defined by horizontal shelves 89 and vertical partitions 91. Shelves 89 may include outwardly projecting lips (not shown) and/or outwardly slidable shelf extensions (not shown) serving as rests or supports for cassettes 60 during access operations. Alternatively, the entire support function may be carried out by the traveling robot mechanisms.

Grid arrays 78 and 80 are serviced by multiple robot mechanisms 90 and 92 movably mounted to respective tracks or rails 94 and 96 which extend along grid arrays 78 and 80. Robot mechanisms 90 and 92 each include at least one robotic arm 98 for alternately removing and inserting cassettes 60 into the receptacles of arrays 78 and 80 and preferably also for accessing removed cassettes 60 to remove or insert vials 62 therein.

A first set of additional track sections or rails 100 extends parallel to walls 74a and 74c and tracks or rails 94 and 96, parallel thereto, between adjacent rows 102 of storage units 84, while a second set of additional track sections or rails 104 extends parallel to walls 74b and 74d and perpendicularly to track sections or rails 100. Additional robot mechanisms 106 and 108 move along track sections or rails 100 and 104, respectively, for accessing the vial- or specimen-containing cassettes in receptacles 88 of storage units 84. It is possible, of course, to provide the storage system of FIG. 8 with only a single robot mechanism 90, 92, 100 or 104 or a limited number of such robot mechanisms which would access all storage receptacles in grid arrays 78 and 80 and all storage receptacles 88 in storage units 84, as well as access storage containers or tanks 82. To that end, the one or few robot mechanisms would be able to negotiate all track sections or rails 94, 96, 100, 104, as well as along a track section or rail 110 extending along containers or tanks 82. Preferably, however, many robot mechanisms 90, 92, 106 and 108 are provided for accessing vial-containing cassettes 60, including robots 112 translatable along track or path 110 for accessing storage containers or tanks 82 as well as rear sides of a rear line (not separately designated) of storage units 84.

The various robot mechanisms 90, 92, 106, 108 and 112 may cooperate with each other to transfer vials 62 and/or entire cassettes 60 between the respective storage arrays or units 78, 80, 82, and 84, on the one hand, and one or more serving hatches (not shown) provided in wall 74d of enclosure 73. Wall 74d is a rear wall of a control room 114 which may contain a computer 116, as well as furniture for supervising personnel, a controlled rate freezer and other ancillary equipment.

Computer 116 is operatively connected to robot mechanisms 90, 92, 106, 108 and 112 for controlling movement and access operations thereof and for registering the stored contents of arrays 78, 80, tanks 82, and storage units 84. Robot mechanisms 90, 92, 106, 108 and 112 are provided with bar code readers (not shown) for identifying specimens stored in the receptacles of grid arrays 78, 80, storage containers or tanks 82, and storage units 84. The bar code readers are tied to computer 116 for enabling continued automated supervision and control. Of course, temperature sensors and feedback loops (not illustrated) are in operative contact with arrays 78, 80, containers or tanks 82, and storage units 84 for monitoring and controlling the temperatures thereof.

A heat exchanger 118, particularly, a cooling unit located on a roof or outside the building, is operatively coupled to arrays 78 and 80 for maintaining the arrays or modular sections thereof, as well as the cassette-stored contents of the modular sections, at preselected temperatures, for instance, at room temperature, minus 20° C., minus 80° C., or minus 196° C.

Figure 11:
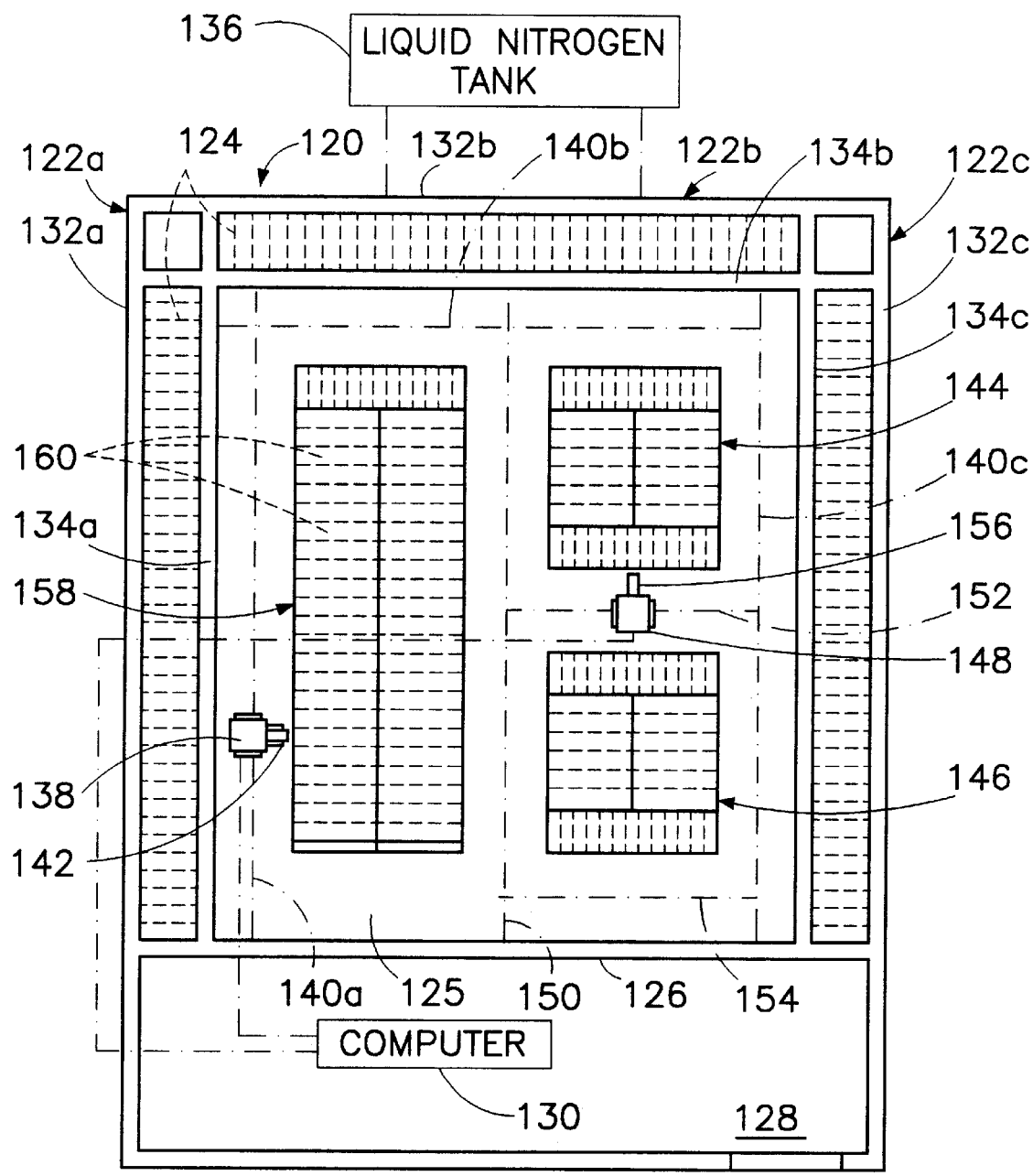
FIG. 11 is a schematic top plan view of a preferred storage unit in accordance with the present invention.

As depicted in FIG. 11, yet another alternative storage system comprises an enclosure 120 defined in part by three walls 122a, 122b, 122c which function as respective storage units each housing a plurality of storage receptacles 124. In each wall or storage unit 122a, 122b, 122c, the respective storage receptacles 124 are arranged in a rectangular grid array extending essentially from the floor to the ceiling of exclosure 120. Enclosure 120 is further defined by a floor surface 125 and a front or forward wall 126 which is the rear wall of an antechamber 128 which contains a control computer 130 as well as ancillary equipment and furniture (not shown) for supervisory personnel.

Walls or storage units 122a, 122b, 122c each have an outer panel 132a, 132b, 132c and an inner panel or partition 134a, 134b, 134c. The rectangular grid structure of receptacles 124 is identical to that shown in FIG. 10 with reference to receptacles 88. Where receptacles 88 and 124 are maintained at room temperature, i.e., the temperature of enclosure 120, there is no need to seal the mouth openings of receptacles 88 or 124. On the other hand, where one of more wall or storage unit 122a, 122b, 122c is maintained at a temperature different from room temperature (and generally lower than room temperature), then it becomes advisable or even necessary to ensure closure of each receptacle 124 of that wall of storage unit 122a, 122b, 122c. Wall or storage unit 122b may, for instance, be connected to a liquid nitrogen storage tank 136 for subjecting that storage unit and the contents of its storage receptacles 124 to low or cryogenic temperatures.

To ensure temperature integrity of low-temperature receptacles 124, the receptacles may be provided with respective hinged door seals (not shown) which are alternately opened and closed by a robot mechanism 138. Robot mechanism 138 travels along a path or track 140a, 140b, 140c extending parallel to a respective wall or storage unit 122a, 122b, 122c so that the robot's exact position along paths or tracks 140a, 140b, 140c is determinable by computer 130. As discussed above, the position of robot mechanism 138 may be measured by encoders or detectors, such as ultrasonic or infrared detectors. Robot mechanism 138 includes at least one arm 142 which alternately opens and closes the receptacle doors and alternately extracts from the receptacles or inserts into the receptacles vials 62, vial holders or cassettes 60, etc.

Inside enclosure 120, spaced from walls 122a, 122b, 122c are a pair of columnar or prismatic storage units 144 and 146 essentially identical to storage units 84 (FIGS. 9 and 10). Storage columns 144 and 146 are serviced by one or more robot mechanisms 148 (only one shown) movably mounted to respective tracks or rails 140b, 140c, 150, 152 and 154 which collectively extend around storage columns 144 and 146. Robot mechanisms 148 each include at least one robotic arm 156 for alternately removing and inserting cassettes 60 into the receptacles 88 of storage columns 144 and 146 and preferably also for accessing removed cassettes 60 to remove or insert vials 62 therein.

Enclosure 120 also contains a ganged or enlarged columnar storage unit 158 spaced from walls 122a, 122b, 122c and from storage columns 144 and 146. Storage unit 158 has a structure similar to that of columns 144 and 146. On two, three or four sides, storage unit 158 is formed with a rectangular grid array of prismatic (elongate cubic) receptacles or cells 160 similar in structure and functions to receptacles 88. Storage unit 158 is serviced by robot mechanisms 138, 148, etc., traveling along paths or track sections 140a, 140b, and 150.

Robot mechanisms 138, 148, etc., may cooperate with each other to transfer vials 62 and/or entire cassettes 60 between the respective storage units 122a, 122b, 122c, 144, 146, and 158, on the one hand, and one or more serving hatches (not shown) provided in wall 126 of enclosure 120. A controlled rate freezer and other equipment (not shown) may be disposed in antechamber 128 for performing functions ancillary to the transfer of vials 62 and cassettes 60.

Computer 130 is operatively connected to robot mechanisms 138 and 148 for controlling movement and access operations thereof and for registering the stored contents of storage units 122a, 122b, 122c, 144, 146, and 158. Robot mechanisms 138 and 148 are provided with bar code readers (not shown) for identifying specimens stored in the receptacles 124, 88, 160 of storage units 122a, 122b, 122c, 144, 146, and 158. The bar code readers are tied to computer 130 for enabling continued automated supervision and control. Of course, temperature sensors and feedback loops (not illustrated) may be disposed in operative contact with storage units 122a, 122b, 122c, 144, 146, and 158 for monitoring and controlling the temperatures thereof The storage facility of FIG. 11 is particularly well suited to storing large numbers of specimens. Storage units 122a, 122b, 122c, 144, 146, and 158 have no internal moving parts, thus facilitating repair and maintenance operations and increasing the longevity of the facility, especially as concerns low temperature storage unit 122b.

As shown in FIG. 12, a multiple-compartment or segmented vial assembly 161 utilizable in the storage cassette 60 of FIGS. 5 and 6 includes several individual vials 162a, 162b, 162c, 162d each provided with a respective cap 164a, 164b, 164c, 164d which is provided with a recess 166 for removably or releasably receiving a lower portion 168 of another vial 162b, 162c, 162d. Cap 164d of uppermost vial 162d has a recess 170 for receiving an extension of an additional cap 172.

It is generally contemplated that vials 162a, 162b, 162c, 162d contain respective samples or specimens of the same biological material, for instance, an individual's blood or DNA or stem cells. Cap 172 is hollow for storing a small amount of the same biological material stored in vials 162a, 162b, 162c, 162d. Cap 172 facilitates the extraction of a sample of the biological material, for example, for purposes of confirming the identity of the biological material in vial assembly 161.

Vials 162a, 162b, 162c, 162d are each provided with an identical bar code 174 identifying the biological sample stored in the vials. As discussed above, the various robot mechanisms disclosed herein are provided with bar code readers (not shown) in part for scanning bar codes 174. The bar code readers are operatively connected to computer 38, 116, or 130 for enabling verification of specimens in vial assembly 161.

As shown in FIGS. 13–15, another segmented vial assembly 176 utilizable in the storage cassette 60 of FIGS. 5 and 6 includes several individual vials 178a, 178b, 178c, 178d extending longitudinally essentially the length of vial assembly 176. Vials 178a, 178b, 178c, 178d have a common cap 180 which binds the vials together at an upper end of assembly 176. A ring 182 is provided for coupling the vials 178a, 178b, 178c, 178d to each other at a lower end of vial assembly 176. Ring 182 is locked to vials 178a, 178b, 178c, 178d in a friction fit and is slidably removable from the vials. Vials 178a, 178b, 178c, 178d may be provided with their own caps 184a, 184b, 184c, 184d, as indicated in FIG. 14.

It is generally contemplated that vials 178a, 178b, 178c, 178d contain respective samples or specimens of the same biological material, for instance, an individual's blood or DNA or stem cells. Vial assembly 176 can be made small for holding DNA samples or large for holding organs and organ parts. Moreover, vial assembly may have an overall shape other than cylindrical, for example, hexagonal (six vials) or octagonal (eight vials).

Vials 178a, 178b, 178c, 178d may each be provided with an identical bar code (not shown) identifying the biological sample stored in the vials, as discussed above with reference to FIG. 12.

As shown in FIG. 16, a modified segmented vial assembly 186 similar to vial assembly 176 includes elongate vials 188a, 188b, 188c having different cross-sections.

Upon automated removal of vial assembly 161 or 176 from a cassette 60 as described herein, any one vial 162a, 162b, 162c, 162d or 178a, 178b, 178c, 178d may be automatically extracted by a robot mechanism from the removed vial assembly 176 or 161 or and replaced with an empty substitute vial (not separately shown). The substitute vial may be provided with a bar code identifying the substitute vial as such.

Vials or compartments 162a, 162b, 162c, 162d of vial assembly 161 or vials or compartments 178a, 178b, 178c, 178d of vial assembly 176 contain related biological specimens such as DNA, a blood sample, stem cells, and one or more tissue samples all from the same individual. In another example, Alternatively, the compartments of a single vial assembly 161 or 176 might store stem cells suitable for generating cells of different types, such as skin, bone, muscle, liver, pancreas, and nerve cells. The contents of the various vials 162a, 162b, 162c, 162d or 178a, 178b, 178c, 178d can be used for treating particular diseases and disorders, for instance, by hematopoietic reconstitution. Such diseases and disorders include, for example, hyperproliferative stem cell disorders, aplastic anemia, pancytopenia, agranulocytosis thrombocytopeniam, red cell aplasia, acute lymphoblastic (lymphocytic) leukemia, chronic lymphocytic leukemia, acute myelogenous leukemia, chronic myelogenous leukemia, acute malignant myelosclerosis, multiple myeloma polycythemia vera, agnogenic myelometaplasia, Waldenstrom's macroglobulinemia, Hodgkin's lymphoma, non-Hodgkins's lymphoma, immunosuppression in patients with malignant, solid tumors, such as malignant melanoma, carcinoma of the stomach, ovarian carcinoma, breast carcinoma, small cell lung carcinoma, retinoblastoma, testicular carcinoma, glioblastoma, rhabdomyosarcoma, neuroblastoma, lymphoma, autoimmune diseases such as rheumatoid arthritis, diabetes, chronic hepatitis, multiple sclerosis, systemic lupus erythematosus, congenital disorders including, anemias, familial aplastic anemia, Fanconi's syndrome, Bloom's syndrome, pure red cell aplasia (PRCA), dyskeratosis congenita, congenital dyserythropoietic syndromes, Chwachmann-Diamond syndrome, dihydrofolate reductase deficiencies, formamnino transferase deficiency, Lesch-Nyhan syndrome, congenital spherocytosis, congenital elliptocytosis, congenital stomatocytosis, congenital Rh null disease, paroxysmal nocturnal hemoglobinuria, G6PD (glucose-6-phosphate dehydrogenase deficiency), pyruvate kinase deficiency, congenital erythropoietin sensitivity deficiency, sickle cell anemia, thalassemia, met-hemoglobinemia, congenital disorders of immunity including severe combined immunodeficiency disease (SCID), bare lymphocyte syndrome, ionophore-responsive combined immunodeficiency, nucleoside phosphorylase deficiency, granulocyte actin deficiency, infantile agranulocytosis, Gaucher's disease, adenosine deaminase deficiency, Kostmann's syndrome, reticular dysgenesis, congenital leukocyte dysfunction syndromes, osteoperosis, myelosclerosis, acquired hemolytic anemias, acquired immunodeficiencies, infectious disorders causing primary or secondary immunodeficiencies including bacterial infections (e.g., Brucellosis, Listerosis, tuberculosis, leprosy), parasitic infections (e.g., malaria, Leishmaniasis), fungal infections, phagocyte disorders, Kostmann's agranulocytosis, chronic granulomatous disease, Chediak-Higachi syndrome, neutrophil actin deficiency, neutrophil membrane GP-180 deficiency, metabolic storage diseases, mucopolysaccharidoses, mucolipidoses, other disorders including Wiskott-Aldrich Syndrome and alpha 1-antitrypsin deficiency.

Although the invention has been described in terms of particular embodiments and applications, one of ordinary skill in the art, in light of this teaching, can generate additional embodiments and modifications without departing from the spirit of or exceeding the scope of the claimed invention. For example, receptacles 20, 88 124, and 160 may have a plurality of different sizes within a single storage facility (i.e., enclosure 12, 42, 73, 120). It is considered more efficient to gang similarly sized receptacles in the same location.

Storage units 84, 144, 146 may have any columnar configuration. However, prismatic configurations are preferred. Thus, storage units 84, 144, 146 each have at least three sides and may have five, six and more sides, but preferably have four sides as illustrated. Storage units 84, 144, 146 are preferably supported on a floor surface. It is possible, however, for these storage units to be suspended from an overhead superstructure (not shown). Other storage units described herein may similarly be suspended.

It is to be noted that at least two sides of the storage units 84, 144, 146 are provided with respective arrays of individually accessible storage receptacles 88. Receptacles 88 generally have their own access openings 190 (FIG. 9) through which storage cassettes 60 are moved during robot-mediated insertion and removal operations.

Accordingly, it is to be understood that the drawings and descriptions herein are proffered by way of example to facilitate comprehension of the invention and should not be construed to limit the scope thereof.

What is claimed is:

1. A storage system comprising:
   an enclosure having a plurality of vertical walls connected to one another via a floor surface;
   a rectangular grid array of first storage receptacles disposed along at least one of said walls;
   second storage receptacles disposed inside said enclosure and spaced from said walls;
   a first track section extending along said one of said walls, parallel thereto;
   a second track section extending to said second storage receptacles;
   a robot mechanism movable along said first track section, said robot mechanism having a robotic arm for accessing at least said first storage receptacles;
   a heat exchanger operatively coupled to said first storage receptacles for maintaining contents thereof in a range of temperatures below a preselected low temperature; and
   a computer operatively connected to said robot mechanism for controlling movement and access operations thereof and for registering the contents of said storage receptacles.

2. The storage system defined in claim 1, further comprising a multiple-compartment vial assembly disposed in at least one of said receptacles, said vial assembly having a plurality of vials releasably bound to one another.

3. The storage system defined in claim 1, further comprising a multiplicity of cassettes each disposed in a respective one of said first storage receptacles and said second storage receptacles.

4. The storage system defined in claim 3 wherein said cassettes each include at least two storage chambers or compartments accessed via respective covers or doors disposed on opposite sides of the respective cassette.

5. The storage system defined in claim 3 wherein at least one of said cassettes holds a multiple-compartment vial assembly having a plurality of vials releasably bound to one another.

6. The storage system defined in claim 1 wherein said one of said walls comprises an outer wall and an inner wall, said first storage receptacles being disposed between said outer wall panel and said inner wall.

7. The storage system defined in claim 6 wherein said outer wall and said inner wall define a storage space, a plurality of said first receptacles being in communication with said storage space so as to be at a common temperature.

8. The storage system defined in claim 7, further comprising a temperature-control apparatus operatively connected to said storage space for regulating same to have a temperature within a predetermined range.

9. The storage system defined in claim 7, further comprising a plurality of specimen-holding containers disposed in respective ones of said first receptacles, said robot mechanism being located only outside of said storage space.

10. The storage system defined in claim 9 wherein said containers include a plurality of vial assemblies each including a plurality of vial segments defining separate compartments, said segments being removably connected to one another, whereby any one of said segments may be separated from another segment while maintaining complete integrity of contents of the separated segments.

11. The storage system defined in claim 9 wherein said segments have a common length and are disposed side-by-side in parallel with one another.

12. The storage system defined in claim 1 wherein said second storage receptacles are disposed in at least one columnar arrangement in turn disposed in said enclosure.

13. The storage system defined in claim 12 wherein said second track section is one of a plurality of track sections collectively surrounding said columnar arrangement.

14. The storage system defined in claim 13, further comprising an additional robot mechanism movable along at least one of said plurality of track sections, said additional robot mechanism having a robotic arm for accessing at least some of said second storage receptacles.

15. The storage system defined in claim 14, further comprising a plurality of specimen-holding containers disposed in respective ones of said second receptacles, said additional robot mechanism and any other servomechanism for removing said containers from said second receptacles and inserting said containers into said second receptacles being located only outside of said columnar arrangement.

16. The storage system defined in claim 14, further comprising a multiplicity of cassettes each disposed in a respective one of said second storage receptacles.

17. The storage system defined in claim 16 wherein said cassettes each include at least two storage chambers or compartments accessed via respective covers or doors disposed on opposite sides of the respective cassette.

18. A storage system comprising:

an enclosure having a plurality of vertical walls connected to one another via a floor surface, one of said walls comprising an outer wall and an inner wall;

a rectangular grid array of first storage receptacles disposed along at least said one of said walls, said first storage receptacles being disposed between said outer wall panel and said inner wall;

second storage receptacles disposed inside said enclosure and spaced from said walls;

a first track section extending along said one of said walls, parallel thereto;

a second track section extending to said second storage receptacles;

a robot mechanism movable along said first track section, said robot mechanism having a robotic arm for accessing at least said first storage receptacles; and a computer operatively connected to said robot mechanism for controlling movement and access operations thereof and for registering the contents of said storage receptacles.

19. The storage system defined in claim 18, further comprising a temperature-control apparatus operatively connected to said storage space for regulating same to have a temperature within a predetermined range.

20. The storage system defined in claim 18 wherein said outer wall and said inner wall define a storage space, a plurality of said first receptacles being in communication with said storage space so as to be at a common temperature.

21. The storage system defined in claim 20, further comprising a plurality of specimen-holding containers disposed in respective ones of said first receptacles, said robot mechanism being located only outside of said storage space.

22. The storage system defined in claim 21 wherein said containers include a plurality of vial assemblies each including a plurality of vial segments defining separate compartments, said segments being removably connected to one another, whereby any one of said segments may be separated from another segment while maintaining complete integrity of contents of the separated segments.

23. The storage system defined in claim 21 wherein said segments have a common length and are disposed side-by-side in parallel with one another.

24. A storage system comprising:

an enclosure having a plurality of vertical walls connected to one another via a floor surface;

a rectangular grid array of first storage receptacles disposed along at least one of said walls;

second storage receptacles disposed inside said enclosure and spaced from said walls, said second storage receptacles being disposed in at least one columnar arrangement in turn disposed in said enclosure;

a first track section extending along said one of said walls, parallel thereto;

a second track section extending to said second storage receptacles, said second track section being one of a plurality of track sections collectively surrounding said columnar arrangement;

a robot mechanism movable along said first track section, said robot mechanism having a robotic arm for accessing at least said first storage receptacles; and a computer operatively connected to said robot mechanism for controlling movement and access operations thereof and for registering the contents of said storage receptacles.

25. The storage system defined in claim 24, further comprising an additional robot mechanism movable along at least one of said plurality of track sections, said additional robot mechanism having a robotic arm for accessing at least some of said second storage receptacles.

26. The storage system defined in claim 25, further comprising a plurality of specimen-holding containers disposed in respective ones of said second receptacles, said additional robot mechanism and any other servomechanism for removing said containers from said second receptacles and inserting said containers into said second receptacles being located only outside of said columnar arrangement.

27. The storage system defined in claim 25, further comprising a multiplicity of cassettes each disposed in a respective one of said second storage receptacles.

28. The storage system defined in claim 27 wherein said cassettes each include at least two storage chambers or compartments accessed via respective covers or doors disposed on opposite sides of the respective cassette.

29. A storage system comprising:

an enclosure having a plurality of vertical walls connected to one another via a floor surface;

a rectangular grid array of first storage receptacles disposed along at least one of said walls;

second storage receptacles disposed inside said enclosure and spaced from said walls;

a multiplicity of cassettes each disposed in a respective one of said first storage receptacles and said second storage receptacles, said cassettes each including at least two storage chambers or compartments accessed via respective covers or doors disposed on opposite sides of the respective cassette;

a first track section extending along said one of said walls, parallel thereto;

a second track section extending to said second storage receptacles;

a robot mechanism movable along said first track section, said robot mechanism having a robotic arm for accessing at least said first storage receptacles; and a computer operatively connected to said robot mechanism for controlling movement and access operations thereof and for registering the contents of said storage receptacles.

30. The storage system defined in claim 29 wherein at least one of said cassettes holds a multiple-compartment vial assembly having a plurality of vials releasably bound to one another.

31. The storage system defined in claim 30, further comprising a heat exchanger operatively coupled to said first storage receptacles for maintaining contents thereof in a range of temperatures below a preselected low temperature.

* * * * *